United States Patent [19]

Modesitt et al.

[11] Patent Number: 4,897,102

[45] Date of Patent: Jan. 30, 1990

[54] GLASS SHEET PRESS BENDING MOLD

[75] Inventors: William L. Modesitt; Floyd T. Hagedorn, both of Sherman, Tex.; Harold R. Hall, Whitehouse, Ohio

[73] Assignee: Libbey-Owens-Ford Co., Toledo, Ohio

[21] Appl. No.: 323,356

[22] Filed: Mar. 14, 1989

[51] Int. Cl.$^4$ .......................................... C03B 23/023
[52] U.S. Cl. ...................................... 65/287; 65/104; 65/273; 65/374.11
[58] Field of Search ............ 65/104, 273, 287, 374.11

[56] References Cited

U.S. PATENT DOCUMENTS

| | | | |
|---|---|---|---|
| 4,246,313 | 1/1981 | Stengle, Jr. | 65/374.11 X |
| 4,274,857 | 6/1981 | Wolfe | 65/273 X |
| 4,522,641 | 6/1985 | Hagedorn et al. | 65/287 X |
| 4,579,577 | 4/1986 | Claassen | 65/287 X |

Primary Examiner—Arthur Kellogg
Attorney, Agent, or Firm—Marshall & Melhorn

[57] ABSTRACT

An improved covering for continuous surface press bending molds providing selectively variable rigidity for matching that desired in bending a particular part on the mold. The shaping element of the mold includes a resilient body having a latticework of flexible metallic bands encapsulated therein. The resilient body is covered by a plurality of superimposed individual sheets of a fibrous, heat-resistant, normally pliable material which, in turn, are covered by a layer of fiberglass cloth. One or more of the individual fibrous sheets is treated with a rigidizer to impart a selected suitable degree of rigidity to the shaping element.

20 Claims, 1 Drawing Sheet

GLASS SHEET PRESS BENDING MOLD

BACKGROUND OF THE INVENTION

1. Field of the Invention

The present invention pertains generally to the production of curved or bent sheets of glass, and more particularly to a novel continuous shaping element for a press bending mold member.

2. Description of the Prior Art

Curved or bent sheets of glass are commonly employed as glazing closures or windows in present day automotive vehicles. In order to meet the rigid quality standards of the automotive industry, it is imperative that the sheets be bent to precisely defined curvatures which are dictated by the size and shape of the opening in which they are to be mounted. The configuration of the bent sheets is determined by styling considerations in designing the vehicles. While the sheets must be bent to precisely defined curvatures, it is also imperative that the bent sheets meet stringent optical requirements. Thus, the viewing area of the unit as installed must be free from optical defects which would tend to interfere with viewing therethrough. It is therefore necessary that the apparatus employed in bending the glass sheets not only precisely shape the sheets, but also that it do so without adversely affecting their optical quality.

Over the years as automotive styling has evolved, the shapes to which the sheets must be bent have become increasingly complex and difficult to efficiently produce on a mass-production basis. Such curved or bent sheets are now generally produced by a so-called "press bending" technique wherein flat glass sheets are heated to a temperature corresponding substantially to the softening point of the glass. The heated sheets are then pressed or shaped to the desired curvature between male and female mold members having complementary shaping surfaces. The bent sheets are cooled in a controlled manner to either anneal or temper the glass as dictated by their intended end use. Such press bending may suitably be carried out with the sheets oriented vertically, horizontally or obliquely.

In order to consistently achieve a high degree of accuracy in the configuration of the curved sheets while minimizing the application of pressure to the glass surfaces in their viewing area by the press members, the male or convex mold member is generally constructed with a substantially solid or continuous shaping surface which contacts the entire surface of the sheet. The cooperating female or concave mold member is constructed with an outline or ring-type shaping surface which engages only the peripheral edge portions of the sheet.

Various materials including wood, metal and refractories have heretofore been employed in fabricating the solid or continuous shaping surface of such male mold members. Due to a number of factors including deterioration of the material and distortion of the bending surface due to repeated heating and cooling of the mold, over extended periods of use, none has proven entirely satisfactory. Thus, while metal molds are durable, they tend to become distorted and, as warping or distortion occurs, it is necessary to frequently rework the mold and restore its surface to the prescribed configuration.

Adjustable surface solid metal molds were developed in response to the distortion problem. In such molds the shaping surface comprises a continuous, relatively flexible metal plate affixed to a rigid backing structure at strategic locations over its area by adjustable length posts or adjustment screws. The contour of the metal plate can thus be readily adjusted, within limits, to maintain the prescribed configuration by appropriately manipulating the adjustment screws. In order to produce the compound curvature found in many automobile windows, that is, sheets bent about mutually perpendicular axes of bending, it is necessary that the metal sheet be preshaped or stamped to the approximate required curvature since the metal is relatively inelastic and not adapted to being formed to compound curvatures by pure bending. The surface configuration can be modified slightly by manipulation of the adjustment screws, but excessive manipulation will cause creases or ripples to form in the surface of the metal sheet.

More recently, molds having so-called flexible continuous shaping surfaces have been proposed. As disclosed in U.S. Pat. No. 4,522,641, issued June 11, 1985, one such mold utilizes a shaping element comprising a resilient body having a latticework of flexible metal bands encapsulated therein. The shaping element, in turn, is affixed to a base member by a plurality of adjusting devices located at spaced intervals along the flexible bands. The encapsulating material comprising the resilient body and providing the design surface for the shaping element may be a material such as silicone rubber or other resilient material which is flexible and able to withstand the high temperatures to which it is subjected. The glass-facing surface of the shaping element is covered by a layer of material such as fiberglass cloth to present a smooth resilient surface to the heat-softened sheet. It is disclosed that one or more layers of untreated Fiberfrax ® paper may be disposed between the shaping element and fiberglass cloth to insulate the silicone rubber from the heat and smooth out any irregularities which may appear on the surface of the shaping element.

Such molds, while they represent a distinct improvement over earlier solid male molds, have certain limitations which may restrict their use under some circumstances. Thus, it has been found that different degrees of rigidity of the shaping surface may be desirable for bending different glass parts, particularly parts which are of different thicknesses such as the relatively thin sheets used in laminated units and the thicker sheets used for monolithic tempered units. The resilient body forming the design surface of the shaping element may not be sufficiently rigid to impart the desired curvature to the glass sheet being pressed thereagainst by the female press ring. On the other hand, if the resilient body itself is made sufficiently rigid for some purposes, it may be unduly rigid for others. There is no provision for adapting the mold to accommodate parts requiring different degrees of rigidity.

SUMMARY OF THE INVENTION

The present invention alleviates the above-noted shortcomings of prior art devices by providing an improved covering for continuous surface bending molds, the rigidity of which can be selectively varied to match the requirements for the particular part to be bent on the mold. The novel mold comprises a continuous shaping element including a resilient body having a latticework of flexible metallic bands encapsulated therein. The metal bands are attached at spaced intervals therealong to a base plate by means of support posts so as to generally determine the contour of the shaping element. The resilient body is covered by a plurality of superimposed individual sheets of a ceramic fiber product, for example, the alumino-silicate fiber material commercially available under the name "Fiberfrax". The sheets, in turn, are covered by a layer of fiberglass cloth. One or more of the individual sheets of aluminosilicate fiber is treated with an inorganic binder or rigidizer in order to impart a suitable degree of rigidity or stiffness to the shaping element while still retaining a relatively soft glass contacting surface. The number of sheets to be treated with the rigidizer is determined by the degree of rigidity found appropriate for producing the bend in a particular glass part.

It is therefore a primary object of the present invention to provide an improved continuous surface bending mold construction adapted for bending glass sheets of different thicknesses.

Another object of the invention is to provide such a bending mold wherein the rigidity of the continuous shaping element is adapted to be correlated to the particular part to be bent on the mold.

Still another object of the invention is to provide such a bending mold having a continuous shaping element which is sufficiently rigid to precisely bend a glass sheet to a desired curvature, and whose glass contacting surface is sufficiently resilient to avoid creation of imperfections on the glass.

Other objects and advantages will become more apparent during the course of the following description when taken in connection with the accompanying drawing.

BRIEF DESCRIPTION OF THE DRAWINGS

In the drawing, wherein like numerals refer to like parts throughout.

DETAILED DESCRIPTION OF THE PREFERRED EMBODIMENT

Figure 1:
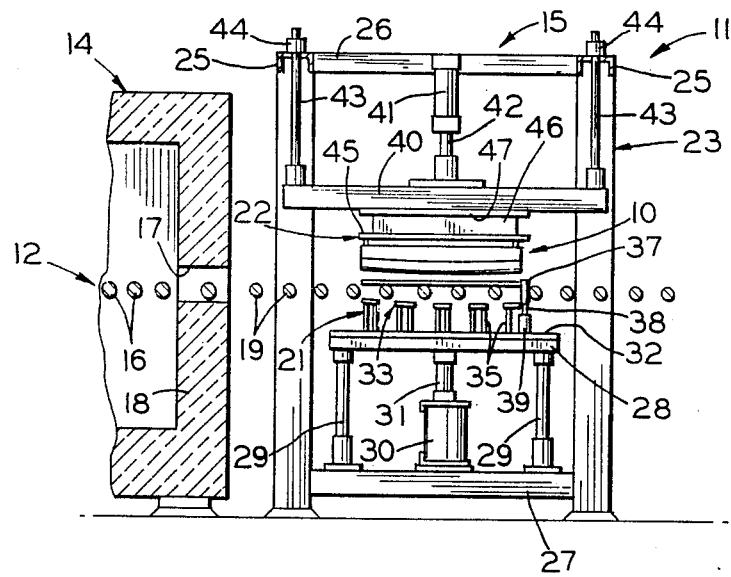
FIG. 1 is a side elevational view of a press bending apparatus embodying the novel male press member of the invention.

With reference now to the drawings, there is illustrated generally at 10 in FIG. 1, the improved bending member of the invention as embodied in a horizontal press bending apparatus, identified generally at 11. The apparatus 11 more particularly includes a continuous conveyor system 12 for supporting and conveying glass sheets (not shown) along a generally horizontal path through a furnace 14 for heating the sheets to their softening point or bending temperature, a press bending station 15 embodying the bending member 10 whereat the sheets are bent to the desired shape, and thereafter to subsequent stations (not shown) where the heated bent sheets are appropriately cooled so as to be tempered or annealed for subsequent fabricating steps. It will be understood that while the invention is described herein in the environment of horizontal bending apparatus, it is not restricted to such apparatus by may as well be employed in a vertical press bending apparatus or other apparatus utilizing either a single mold member or opposed press members for shaping sheet of glass or the like.

The glass sheets are conventionally heated in a controlled manner while being carried, one following another, through the furnace 14 on aligned conveyor rolls 16 forming part of the conveyor system 12. The sheets, heated to their proper bending temperature, exit the furnace through an opening 17 in the rear end wall 18 and are transferred onto a second series of conveyor rolls 19, also forming part of the conveyor system 12. The rolls 19 support and convey the glass sheets horizontally into and within the bending station 15 before and after bending, and then advance the bent sheets to the next processing step (not shown), typically tempering or annealing of the sheets.

The press bending apparatus 11 more particularly comprises a vertically reciprocable lower press member 21, and an upper press member 22 which carries the bending member 10, both mounted within a rigid framework 23. The framework includes vertical columns 24 located at the corners of the press apparatus 11 on either side of the conveyor system and spaced therealong. The columns 24 extend upwardly above the upper press member 22 and are interconnected at their upper ends by horizontal beams 25 and 26 extending transversely and longitudinally, respectively, of the conveyor system. A base member 27 extending between the columns 24 supports the lower press member 21 and it associated operating mechanism. The upper press member 22 is thus mounted above the conveyor rolls 19 while the lower press member 21 is normally disposed below the conveyor rolls 19 and mounted on a carriage 28 for vertical reciprocating movement toward and away from the upper press member.

The carriage 28 is supported for such reciprocating movement by guide members 29, and is vertically movable by a fluid actuator 30 affixed to the base member 27. The fluid actuator includes a suitable piston rod 31 for moving the press member 21 between its lowered position beneath the conveyor rolls 19, and an upper position thereabove for lifting a heat-softened glass sheet from the conveyor rolls and pressing it against the upper press member 22 to form it to the prescribed shape. After bending, the piston rod 31 is retracted to lower the press member 21 beneath the conveyor rolls 29, thereby depositing the bent sheet on the rolls for advancement out of the bending station.

The lower press member 21 is of conventional outline or ring-type construction and comprises a base member 32 secured to the carriage 28 and a shaping rail 33 affixed to the baase member in spaced relation thereto by means of a series of mounting posts 35. The shaping rail conforms in outline to the glass sheets to be bent, and is provided on its upper face with an upwardly directed shaping surface (not shown) to impart the desired curvature to the sheet. The particular outline of the shaping rail 33, as well as the specific curvature of the shaping surface is, of course, dictated by the desired finished shape of the glass sheet being bent. In order to permit displacement of the lower shaping rail 33 above the conveyor rolls 19 for lifting the sheets therefrom into pressing engagement with the upper press member 22, the lower shaping rail is formed of a plurality of segments 36 spaced apart from each other a sufficient distance to permit their passage between adjacent ones of the rolls 19.

A pair of laterally spaced locator stops 37 (only one shown) is positioned to project into the path of movement of the advancing glass sheets to selectively interrupt movement thereof and accuractely locate the sheets in the proper position above the lower press member 21. Each stop 37 is secured to the distal end of a piston rod 38 of a fluidactuated cylinder 39 mounted on the carriage 28. The cylinders 39 are operative to selectively raise and lower the stops between a raised position above the conveyor rolls 19, into the path of an advancing glass sheet, and a lowered position therebeneath.

The upper press member 22 is vertically adjustable and includes a vertically reciprocable platen frame 40, suspended from the framework comprised by the beams 25 and 26, by at least one actuating cylinder 41 having a piston rod 42 connected at its outer end to the platen frame. Guideposts 43 are connected at their lower ends to the four corners of the platen frame 40, and extend upwardly through bushings 44 mounted on the beams 25 for sliding movement therethrough to guide the platen frame during its vertical movement. The bending member 10 of the invention, which is carried by the platen frame 40, includes a base plate 45 affixed by means of an intermediated framework 46 to a support plate 47 on the platen frame.

Figure 2:
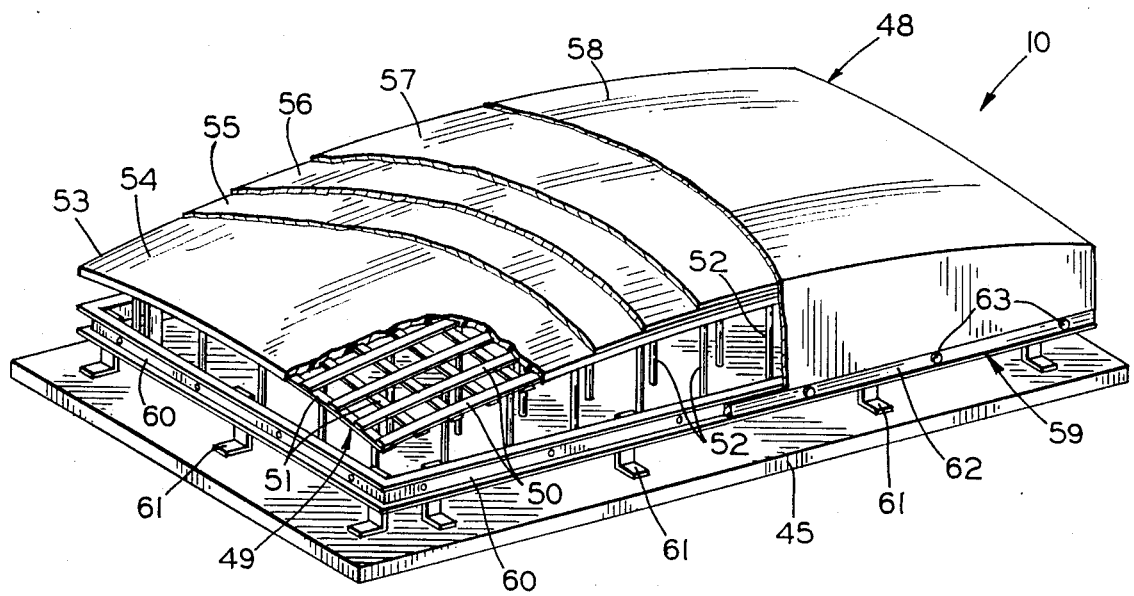
FIG. 2 is an inverted, enlarged perspective view of the press member, with parts broken away for purposes of clarity.

The novel bending member 10, as illustrated in inverted position in FIG. 2, includes a shaping element, identified generally at 48, carried by the baseplate 45. The shaping element comprises a lattice framework or grid 49 of longitudinally and transversely extending metallic bands 50 and 51, respectively, supported in spaced relation to the base plate 45 by a plurality of spaced support posts 52. While it will be appreciated that the novel mold covering arrangement of the invention as hereinafter described may be utilized with other and different grid or backing members, for purposes of permitting the formation of complex curvatures, the invention may advantageously be utilized with a grid of the type illustrated in FIG. 2. Such a grid may, for example, comprise relatively thin flexible steel bands, on the order of ⅛ inch (3 mm) thick by ¾ inch (19 mm) wide, welded or fused at their crossing points to form a solid grid. Of course, the mold covering may also be employed with a latticework assembly of the type disclosed in the aforementioned U.S. Pat. No. 4,522,641, wherein the metal bands are loosely interwoven into an open, unbinding pattern. The individual support posts 52 are of such length that the surface contour of the latticework grid 49 generally corresponds to the curvature to be imparted to a sheet bent thereon.

The grid 49 is encapsulated in a body 53 as of silicone rubber, such as that sold under the trade name RTV, or other resilient material that remains flexible and is capable of withstanding repeated exposure to a high temperature environment. The body 53 is formed on the grid to provide at least a ⅛ inch (3.2 mm) cover over the longitudinal bands 50 so that its outer surface 54 provides the design surface defining the configuration to which a sheet bent thereon is formed.

In male press bending members the glass contacting surface of the shaping element has typically been covered with a suitable cloth to present a smooth and somewhat resilient surface to the heat-softened glass. It has also been proposed to provide one or more layers of untreated Fiberfrax ® paper beneath the fiberglass cloth to insulate the shaping element from the hot glass and assist in smoothing out any irregularities in the surface of the shaping element. As heretofore indicated, it has been found that the rigidity of such composite shaping elements may not be appropriate for bending all glass sheets to desired complex curvatures. Thus, in accordance with the present invention there is disposed over the resilient body 53 a relatively thick layer or layers of a fibrous heat resistant material, with at least one of the layers being treated with a rigidizer to increase the hardness or stiffness of the shaping element to provide the desirable rigidity for bending a particular glass sheet.

Figure 3:
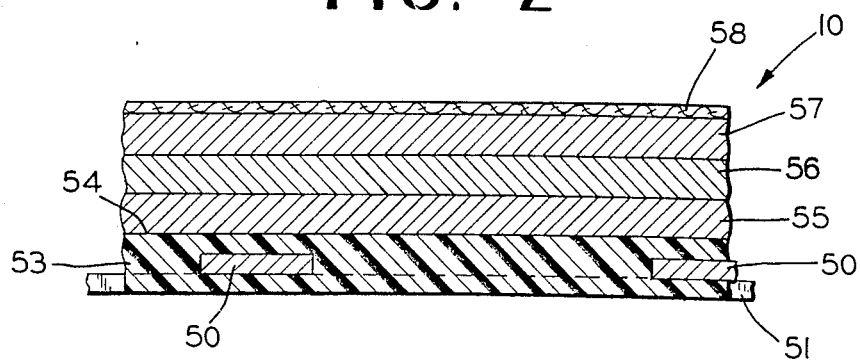
FIG. 3 is an enlarged, fragmentary sectional view illustrating the layers of the composite continuous shaping element.

More particularly, as will be apparent in FIGS. 2 and 3, in accordance with the invention there is provided over the surface 54 of the body 53 individual layers 55, 56 and 57 of fibrous heat resistant material. The outer layer 57 is, in turn, covered by a layer 58 of non-abrasive, heat-resistant material, typically fiberglass cloth. The layer 58 extends over the sides and ends of the shaping element and is secured within a peripheral clamping device 59 so as to be maintained in a taut, wrinkle-free condition over the layer 57.

The clamping device comprises a series of outwardly facing channel members 60 mounted upon the base plate 45 by means of angle brackets 61. The peripheral margins of the layer 58 are engaged within the channel members by clamping bars 62 secured to the channel members as by threaded fasteners 63.

The layers 55, 56 and 57 of fibrous material preferably comprise a mat as of silica, alumina or alumino-silicate fibers, bonded together with 1 to 25 percent by weight of an inorganic binder. The binder may be colloidal alumina, colloidal silica or a mixture thereof, producing a fiber mat having a density less than about 31.1 pounds per cubic foot (500 kilograms per cubic meter). A particularly suitable material is available commercially under the product designation Fiberfrax ® Duraboard 1200. By way of example, a mold cover constructed in accordance with the invention and which has been found to perform very well includes layers 55, 56 and 57 of the aforementioned Fiberfrax material each having a nominal thickness of ¼ inch (6.3 mm). The layer 55 is adhered to the surface of the body 53 by means of a ceramic paint such as is available under the designation Fiberfrax ® QF-180. At least one of the layers, generally the third or outer layer 57, is treated with a rigidizer such as that available from the Carborundum Company under the name Rigidizer W. The material is an inorganic liquid binder compound comprising an aqueous suspension of about 40% colloidal silica and a wetting agent which, when applied to the fibrous material, causes a significant increase in the rigidity and surface hardness of the layer. The number of layers so treated is determined by the degree of hardness or rigidity desired for bending the particular glass sheet which, in turn, is a function of a number of factors including the dimensions and thickness of the sheet and the complexity and degree of the curvature to be imparted thereto. Thus, the rigidity or hardness of the composite mold cover can be adapted as determined appropriate for bending a particular part, by treating any one, two or all three of the layers with the rigidizer. Sheets which are to be laminated as for automobile windshields are relatively thin and, consequently, one or two of the layers of mold covers for bending such sheets are generally treated with rigidizer. Sheets to be employed as monolithic back lights and side lights are much thicker, and all three layers 55, 56 and 57 may advantageously be treated with the rigidizer for bending such sheets. The combination of treated and untreated layers has been found particularly advantageous in the press bending of glass sheets for laminated windshields. The untreated layers, of course, in addition to contributing to the overall effect of the composite mold cover, serve as insulating layers to preclude overheating and consequent deterioration of the body 53.

It is to be understood that the forms of the invention herewith shown and described are to be taken as illustrative embodiments only of the same, and that various changes in the shape, size and arrangement of the parts may be resorted to without departing from the spirit of the invention.

What is claimed is:

1. A glass shaping mold for use in press bending a heated glass sheet, comprising a continuous shaping element having a surface configuration corresponding to the curvature to which said sheet is to be bent, said shaping element including a flexible framework, a resilient body covering said framework, and a plurality of layers of a fibrous, heat-resistant, normally pliable material disposed over said resilient body, at least one of said layers having applied thereto and cured a liquid rigidizer material for increasing the stiffness of said shaping element to a degree appropriate for press bending said hot glass sheet.

2. A glass shaping mold as claimed in claim 1, including three said layers of fibrous, heat resistant, normally pliable material.

3. A glass shaping mold as claimed in claim 2, wherein two of said layers of fibrous, heat-resistant, normally pliable material are treated with said rigidizer material.

4. A glass shaping mold as claimed in claim 2, wherein all three of said layers of fibrous, heat-resistant, normally pliable material are treated with said rigidizer material.

5. A glass shaping mold as claimed in claim 1, wherein said flexible framework includes a grid comprised of flexible, spaced, longitudinally and transversely extending bands.

6. A glass shaping mold as claimed in claim 5, wherein said flexible framework is encapsulated in said resilient body.

7. A glass shaping mold as claimed in claim 6, wherein said resilient body comprises a silicone rubber which remains flexible and is capable of withstanding repeated exposure to high temperatures.

8. A glass shaping mold as claimed in claim 5, in which said longitudinally and transversely extending bands overlap and are rigidly interconnected at their junctures.

9. A glass shaping mold as claimed in claim 5, in which said longitudinally and transversely extending bands are interwoven in an open unbinding pattern.

10. A glass shaping mold as claimed in claim 8, including a base plate and a plurality of support posts affixed at one of their ends to said base plate for supporting said flexible framework in spaced relation to said base plate, said support posts being positioned at spaced locations over said base plate and affixed at their other end to said overlapping bands at said junctures, the lengths of said posts being such that said shaping elements defines said curvature.

11. A glass shaping mold as claimed in claim 2, including a layer of fiberglass cloth disposed over the outermost said layer of fibrous, heat-resistant, normally pliable material for engaging said hot glass sheet as it is shaped on said mold.

12. A glass shaping mold as claimed in claim 1, wherein said layer of fibrous, heat-resistant, normally pliable material comprises a mat selected from the group consisting of silica, alumina and alumino-silicate fibers bonded together with an inorganic binder.

13. A glass shaping mold as claimed in claim 12, wherein said binder is selected from the group consisting of colloidal alumina, colloidal silica, and mixtures thereof.

14. A glass shaping mold as claimed in claim 12, wherein said layer of fibrous, heat-resistant, normally pliable material is comprised of "Fiberfrax" material.

15. A glass shaping mold as claimed in claim 1, wherein said rigidizer material is an inorganic liquid compound comprising an aqueous suspension of colloidal silica with a wetting agent known as "Rigidizer W".

16. A glass shaping mold as claimed in claim 1, wherein each of said layers of fibrous, heat-resistant, normally pliable material has a nominal thickness of about one fourth inch.

17. A glass shaping mold as claimed in claim 1, wherein the bottom one of said layers of fibrous, heat-resistant, normally pliable material is adhesively secured over its surface to said resilient body.

18. A method of forming a continuous-surface glass shaping mold for use in press bending a heated glass sheet, comprising forming a flexible framework to the curvature to which the sheet is to be bent, encapsulating said framework in a resilient body covering defining the design surface of said mold, covering said design surface of said resilient body with a plurality of individdual layers of a fibrous, heat-resistant, normally pliable material, and applying to at least one of said layers a liquid rigidizer material and curing said material to impart a predetermined degree of stiffness to the composite covering suitable for press bending said sheet.

19. A method of forming a continuous surface glass shaping mold as claimed in claim 18, including disposing a sheet of fiberglass cloth over the outermost said layer of fibrous, heat-resistant material in a taut, wrinkle-free condition.

20. A method of forming a continuous surface glass shaping mold as claimed in claim 19, wherein said design surface is covered with at least three of said individual layers of fibrous, heat-resistant, normally pliable material, including treating at least two of said individual layers with said rigidizer material.

* * * * *

UNITED STATES PATENT AND TRADEMARK OFFICE
CERTIFICATE OF CORRECTION

PATENT NO. : 4,897,102

DATED : January 30, 1990

INVENTOR(S) : William L. Modesitt, Floyd T. Hagedorn and Harold R. Hall

It is certified that error appears in the above-identified patent and that said Letters Patent is hereby corrected as shown below:

Column 4, line 49, "baase" should read --base--.

Column 5, line 59, after "suitable" insert --non-abrasive, heat-resistant material such as a fiberglass--.

In the claims:

Column 8, line 39, "individdual" should read --individual--.

Signed and Sealed this

Second Day of April, 1991

Attest:

HARRY F. MANBECK, JR.

Attesting Officer

Commissioner of Patents and Trademarks